United States Patent
Sakuraba

(10) Patent No.: US 8,526,043 B2
(45) Date of Patent: Sep. 3, 2013

(54) PRINTING SYSTEM, PRINTING METHOD, AND PRINTING CONTROL APPARATUS FOR SPLITTING DOCUMENT

(75) Inventor: Tamotsu Sakuraba, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 394 days.

(21) Appl. No.: 12/895,925

(22) Filed: Oct. 1, 2010

(65) Prior Publication Data

US 2011/0085201 A1    Apr. 14, 2011

(30) Foreign Application Priority Data

Oct. 9, 2009   (JP) ................. 2009-235729

(51) Int. Cl.
*G06F 15/00*    (2006.01)
*G06F 3/12*    (2006.01)
*G06K 1/00*    (2006.01)

(52) U.S. Cl.
USPC ....................... 358/1.15; 358/1.18

(58) Field of Classification Search
None
See application file for complete search history.

(56) References Cited

U.S. PATENT DOCUMENTS

| | | | |
|---|---|---|---|
| 7,307,743 B2 | 12/2007 | Watanabe et al. | |
| 7,764,394 B2 | 7/2010 | Omura | |
| 2007/0002352 A1* | 1/2007 | Ushio et al. ................. | 358/1.13 |

FOREIGN PATENT DOCUMENTS

| | | |
|---|---|---|
| JP | 2001-353934 A | 12/2001 |
| JP | 2003-280871 | 10/2003 |
| JP | 2004-192395 | 7/2004 |
| JP | 2006-185156 | 7/2006 |

OTHER PUBLICATIONS

Office Action (Notification of Reason for Refusal) dated Oct. 4, 2011, issued in the corresponding Japanese Patent Application No. 2009-235729, and an English Translation thereof.

* cited by examiner

*Primary Examiner* — Douglas Tran
(74) *Attorney, Agent, or Firm* — Buchanan Ingersoll & Rooney PC

(57) ABSTRACT

The printing system according to the present invention has a number-of-pages accepting part for accepting user-specified number of pages, which is referred to as splitting unit for splitting a document consisting of a plurality of pages; and a control part for controlling a printer output operation of the document in such a way that each of the split documents obtained by splitting the document from the first page sequentially in the splitting unit will undergo printer output process configured via a printing setting screen.

8 Claims, 21 Drawing Sheets

FIG.13

```
. . .
TRAY=AUTO              %%  Paper supply  Automatic
STAPLESET=ON           %%  Stapling function  ON
STAPLEPOS=CENTER       %%  Stapling type  Saddle stitching
PUNCHSET=OFF           %%  Punching function  OFF
PUNCHNUM=OFF           %%  Number of holes setting  OFF
LAYOUT=BOOKLET         %%  Imposition  Booklet
DIVIDESET=ON           %%  Document splitting function  ON
DIVIDENUM=8            %%  Splitting unit  8 pages
DIVIDEFUNCSET=ON       %%  Function setting for splitting unit  ON
. . . .
```

FIG.20

Per-page function setting  300

| Page | Repetition | Paper supply tray | Staple | Punch |
|---|---|---|---|---|
| 2 | ☑ | Tray 2 > | OFF > | OFF > |
|  | ☑ | Automatic > | OFF > | OFF > |
| 310 | 330 | 320 | OK | Cancel |

FIG.22

| | | |
|---|---|---|
| TRAY=TRAY1 | %% | Paper supply Tray 1 |
| STAPLESET=OFF | %% | Stapling function OFF |
| STAPLEPOS=OFF | %% | Stapling type OFF |
| PUNCHSET=OFF | %% | Punching function OFF |
| PUNCHNUM=OFF | %% | Number of holes setting OFF |
| LAYOUT=OFF | %% | Imposition OFF |
| DIVIDESET=ON | %% | Document splitting function ON |
| DIVIDENUM=8 | %% | Splitting unit 8 pages |
| DIVIDEFUNCSET=ON | %% | Function setting for splitting unit ON |
| PERPAGESET=2,TRAY2,OFF,OFF | %% | Per-page setting page 2 Tray 2 staple OFF punch OFF |

FIG.23

Per-page function setting 300'

| Page | Paper supply tray | Staple | Punch |
|---|---|---|---|
| 2 | Tray 2 > | OFF > | OFF > |
| 10 | Tray 2 > | OFF > | OFF > |
| ...... | | | |
| 794 | Tray 2 > | OFF > | OFF > |
| 310 | 320 | | |

OK  Cancel

FIG.25

...
TRAY=TRAY1  %%  Paper supply Tray 1
STAPLESET=OFF  %%  Stapling function OFF
STAPLEPOS=OFF  %%  Stapling type OFF
PUNCHSET=OFF  %%  Punching function OFF
PUNCHNUM=OFF  %%  Number of holes setting OFF
LAYOUT=OFF  %%  Imposition OFF
DIVIDESET=OFF  %%  Document splitting function OFF
DIVIDENUM=OFF  %%  Splitting unit OFF
DIVIDEFUNCSET=OFF  %%  Function setting for splitting unit OFF
PERPAGESET=2,TRAY2,OFF,OFF  %%  Per-page setting page 2 Tray 2 staple OFF punch OFF
...

PRINTING SYSTEM, PRINTING METHOD, AND PRINTING CONTROL APPARATUS FOR SPLITTING DOCUMENT

CROSS-REFERENCE TO RELATED APPLICATION

This application is based on Japanese Patent Application No. 2009-235729, filed on Oct. 9, 2009, the contents of which are incorporated herein by reference.

BACKGROUND

1. Technical Field

The present invention relates to a printing system, a printing method, and a printing control apparatus. The present invention particularly relates to a printing system, a printing method, and a printing control apparatus used in printing a document consisting of a plurality of pages.

2. Description of Related Art

Variable printing is known as a printing technology intended for volume printing. In variable printing, a document of a large number of pages is printed out while partially exchanging printing contents in coordination with a database. Atypical type of document to which variable printing is applied is a document containing client information, in which information concerning a plurality of clients is described with respect to each client in units of specific number of pages.

If it is intended to print out a document in which information concerning a plurality of clients is described and distribute to each client a plurality of sheets of paper on which information concerning specific client is printed, it is necessary to produce booklets by breaking up the document in units of specific number of pages to be distributed to each client.

However, in producing a plurality of booklets by breaking up a document of a large number of pages in units of specific number of pages, the user has to execute a certain printing setting for producing the booklets while specifying a range of pages of the document that constitute each booklet, which can be a heavy burden to the user. More specifically, if it is to produce 100 booklets by breaking up a document consisting of 800 pages in units of 8 pages, the user has to specify the range of pages for each booklet, e.g., 1-8th page, 9-16th page, . . . 793-800th page, repeating the printing setting for each booklet for 100 times. Therefore, there is a demand for reducing the user's burden in the printing setting operation for producing a plurality of booklets by breaking up a document of a large number of pages in units of a specific number of pages.

As a technology related to this, the Unexamined Japanese Patent Publication No. 2001-353934 discloses a technology for producing a plurality of booklets by splitting a document in case when the number of pages of the document exceeds a number of pages to which bookbinding process can be applied. However, this technology is intended to produce booklets unrelated to the user's intention, and it is not intended to produce booklets consisting of a number of pages the user wants.

SUMMARY

The present invention is intended to solve the above-mentioned problem. An object of the present invention is to provide a printing system, a printing method, and a printing control apparatus capable of reducing the user's burden in the printing setting operation for splitting a document consisting of a plurality of pages in units of the desired number of pages and applying the desired printer output process to each split document individually.

To achieve at least one of the above-mentioned objects, a printing system reflecting one aspect of the present invention comprises: a number-of-pages accepting part for accepting user-specified number of pages, which is referred to as splitting unit for splitting a document consisting of a plurality of pages; and a control part for controlling a printer output operation of the document in such a way that each of the split documents obtained by splitting the document from the first page sequentially in the splitting unit will undergo printer output process configured via a printing setting screen.

It is preferable that the above-mentioned printing system further comprises: a page-number accepting part for accepting user-specified page number for the split document among the page numbers starting with page 1 corresponding to the first page of each split document; and a process content accepting part for accepting user-specified content of per-page printer output process for the page corresponding to the page number, wherein the control part further controls the printer output operation in such a way that each of the split documents will undergo the per-page printer output process accepted by the process content accepting part, with respect to the page corresponding to the page number.

It is preferable in the above-mentioned printing system that the page-number accepting part comprises: an input accepting part for accepting user input of a page number; a comparing part for comparing the page number accepted by the input accepting part with the splitting unit; and a nullifying part for nullifying the page number accepted by the input accepting part if the page number is greater than the splitting unit.

It is preferable that the above-mentioned printing system further comprises: a selection accepting part for accepting the user's selection concerning whether or not the system should control the printer output operation in such a way that each of the split documents will undergo the printer output process, wherein the control part controls the printer output operation when the selection accepting part accepts a selection of controlling the printer output operation in such a way that each of the split documents will undergo the printer output process.

It is preferable that the above-mentioned printing system further comprises: a cease-instruction accepting part for accepting an instruction to cease the printer output of the split documents, wherein the control part ceases the printer output operation when the cease-instruction accepting part accepts the instruction to cease the printer output.

It is preferable that the above-mentioned printing system further comprises: an authorization part for displaying an input screen for prompting the user to enter a password for allowing the split document to be printed out, when such a password is set up in a print job containing the document, wherein the split documents are printed out sequentially when the password entered by the user matches the password set up in the print job.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 13 is a diagram showing an example of the printing setting information contained in the print job according to the first embodiment of the present invention.

FIG. 20 is a diagram showing an example of the per-page function setting screen.

FIG. 22 is a diagram showing an example of the printing setting information contained in the print job according to the second embodiment of the present invention.

FIG. 23 is a diagram for describing the function effect of the per-page function setting screen shown in FIG. 20.

FIG. 25 is a diagram showing an example of the printing setting information generated based on the per-page function setting screen shown in FIG. 24.

DETAILED DESCRIPTION

The embodiment of this invention will be described below with reference to the accompanying drawings.

First Embodiment

Figure 1:
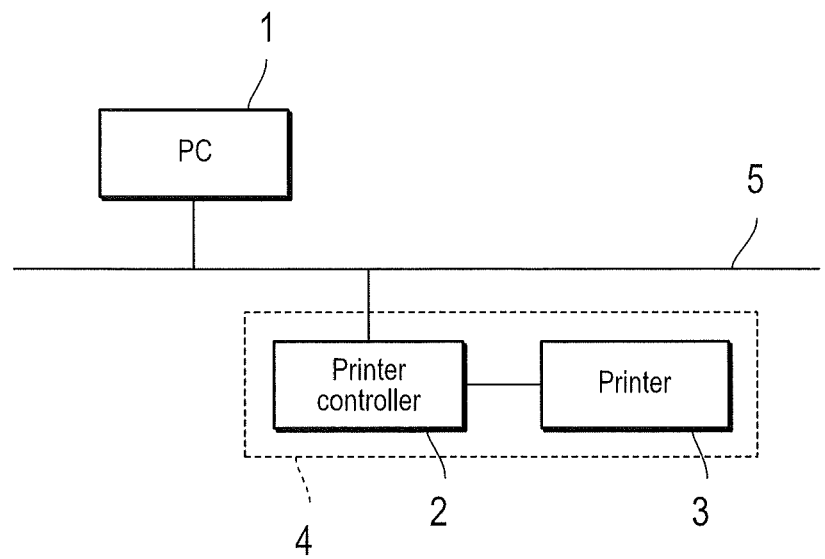
FIG. 1 is a block diagram showing the overall constitution of a printing system according to the first embodiment of the present invention.

FIG. 1 is a block diagram showing the overall constitution of a printing system according to the first embodiment of the present invention.

The printing system according to the present embodiment is equipped with a PC 1 for transmitting a print job and an image forming apparatus 4 for receiving and executing the print job, and they are interconnected via a network 5 to be able to communicate with each other. Also, the PC 1 and the image forming apparatus 4 can be connected directly (locally connected) without recourse to the network 5.

The image forming apparatus 4 consists of a printer controller 2 and a printer 3 which are locally connected with each other. This local connection can be accomplished by means of various local connection interfaces, such as serial interfaces, e.g., USB and IEEE 1394, parallel interfaces, e.g., SCSI and IEEE 1284, wireless communication interfaces, e.g., Bluetooth (registered trademark), IEEE 802.11, HomeRF, IrDA, etc. However, the printer controller 2 and the printer 3 can be connected via the network 5.

Figure 2:
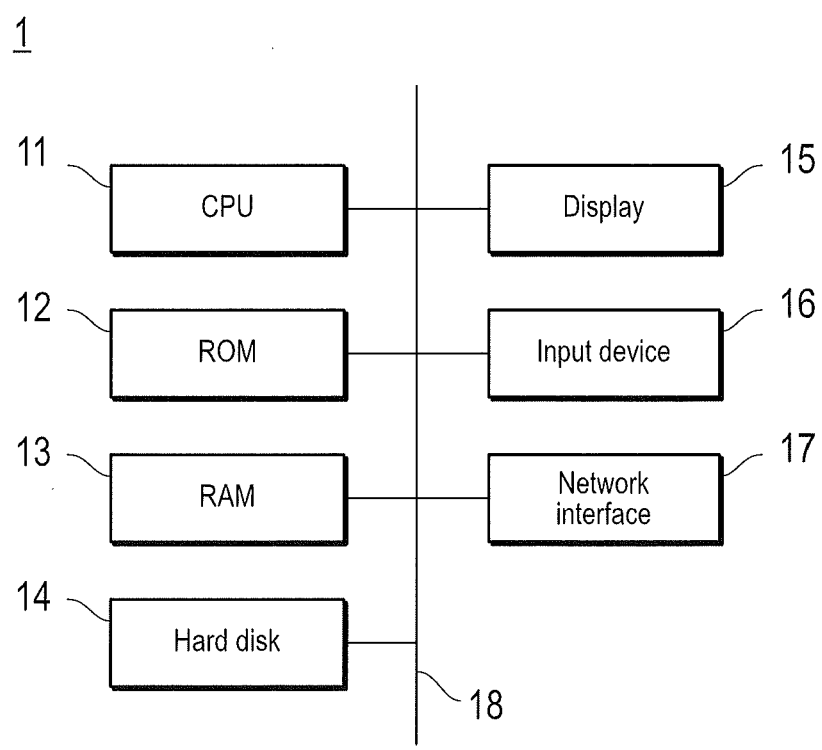
FIG. 2 is a block diagram showing the constitution of the PC shown in FIG. 1.

FIG. 2 is a block diagram showing the constitution of the PC shown in FIG. 1.

The PC 1 has a CPU 11, a ROM 12, a RAM 13, a hard disk 14, a display 15, an input device 16, and a network interface 17, all of which are interconnected with each other via a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and data.

The display 15 can be LCD, CRT, and other displays, and is used for displaying various kinds of information. The input device 16 includes a pointing device such as a mouse, a keyboard, and others, and is used for entering various kinds of information.

The network interface 17 is an interface for communicating with other equipment via the network 5 using standards such as Ethernet, Token Ring, FDDI, etc.

Figure 3:
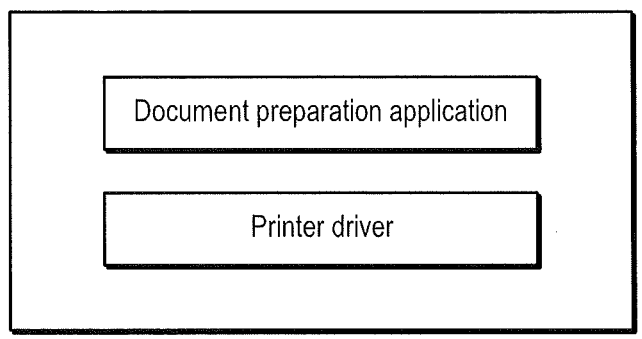
FIG. 3 is a block diagram showing the contents of the hard disk of the PC shown in FIG. 2.

FIG. 3 is a block diagram showing the contents of the hard disk of the PC shown in FIG. 2. The hard disk 14 of the PC 1 is installed with a document preparation application for preparing document files and a printer driver for specifying printing instructions and printing methods for prepared document files. The printer driver generates a print job by converting a document file into print data described in a page description language (PDL) that the printer controller 2 can understand.

If the application program for variable printing is installed on the hard disk 14, the hard disk 14 has areas for storing programs that correspond to a database reading part for reading the database, a contents information reading part for reading the contents information, a data editing part for editing the data, an image information generating part for generating image information, and a printing setting information generating part for generating the printing setting information.

Figure 4:
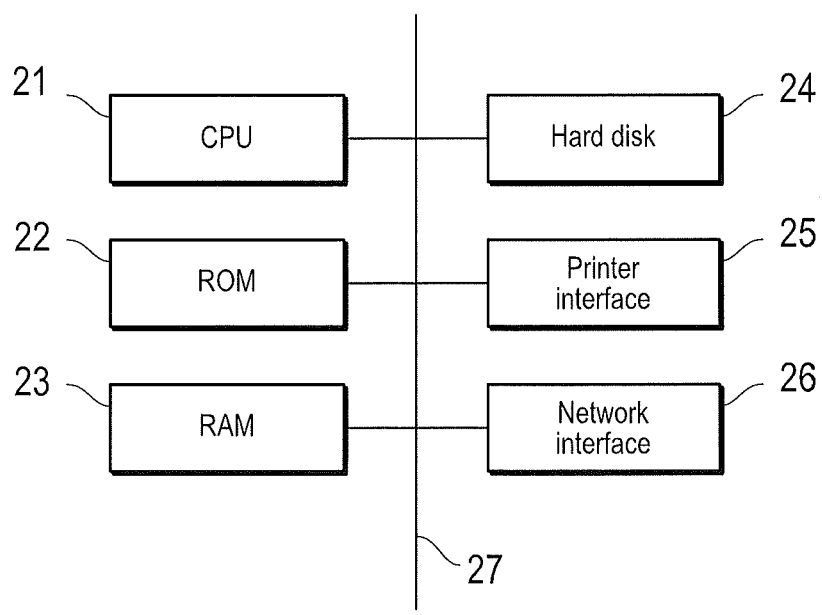
FIG. 4 is a block diagram showing the constitution of the printer controller of the image forming apparatus shown in FIG. 1.

FIG. 4 is a block diagram showing the constitution of the printer controller of the image forming apparatus shown in FIG. 1.

The printer controller 2 as a printing control apparatus has a CPU 21, a ROM 22, a RAM 23, a hard disk 24, a printer interface 25, and a network interface 26, all of which are interconnected with each other via a bus 27 for exchanging signals. The descriptions of those parts of the printer controller 2 that have the same functions as those of the corresponding parts of the PC 1 will be omitted here to avoid being duplicative.

The printer interface 25 is an interface for communicating with the locally connected printer 3.

Figure 5:
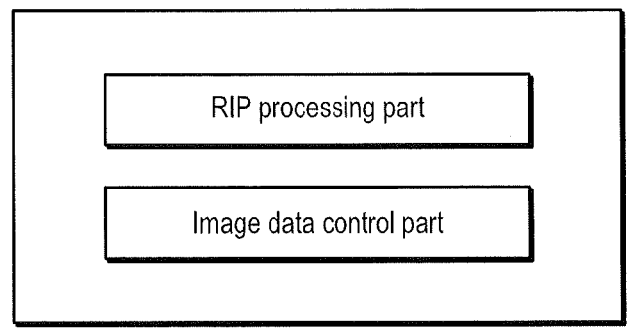
FIG. 5 is a block diagram showing the contents of the hard disk of the printer controller shown in FIG. 4.

FIG. 5 is a block diagram showing the contents of the hard disk of the printer controller shown in FIG. 4. The hard disk 24 of the printer controller 2 has areas for storing programs that correspond to a RIP processing part and an image data control part. The RIP processing part generates image data of the bitmap format by developing print data contained in a print job received from the PC 1. The image data control part applies the imposition process to the image data of the bitmap format and transmits the image data to the printer 3 in a specified page unit. The functions of the RIP processing part and the image data control part are implemented as the CPU 21 executes their respective programs.

Figure 6:
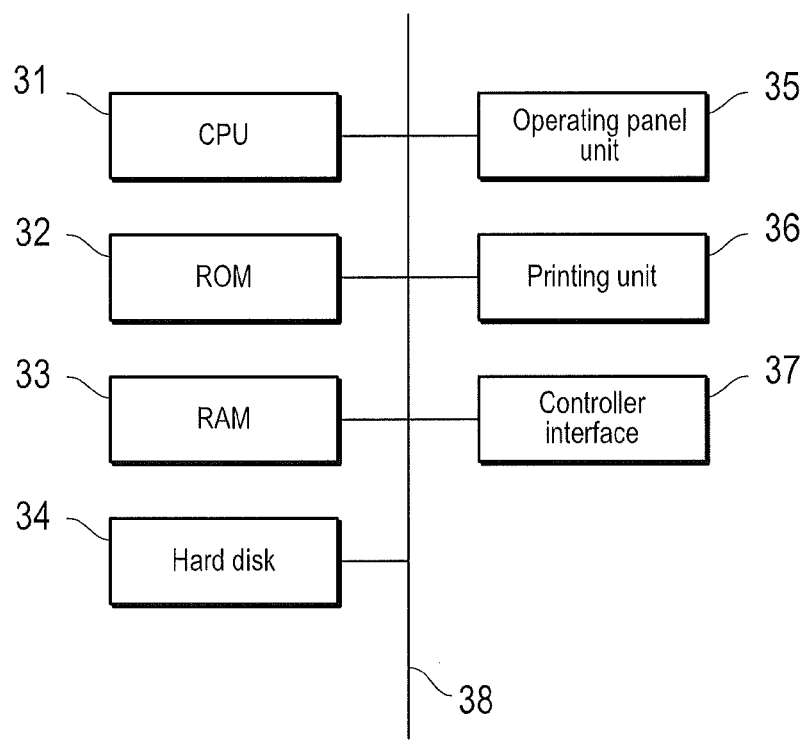
FIG. 6 is a block diagram showing the constitution of the printer of the image forming apparatus shown in FIG. 1.

FIG. 6 is a block diagram showing the constitution of the printer of the image forming apparatus shown in FIG. 1. The printer 3 has a CPU 31, a ROM 32, a RAM 33, a hard disk 34, an operating panel unit 35, a printing unit 36, and a controller interface 37, all of which are interconnected with each other via a bus 38 for exchanging signals. The descriptions of those parts of the printer 3 that have the same functions as those of the corresponding parts of the PC 1 will be omitted here to avoid being duplicative.

The hard disk 34 stores a printer output process program to be executed based on the image data of the bitmap format received from the printer controller 2.

The operating panel unit 35 is equipped with a touch panel, a ten-key pad, a start button, a stop button and others to be used for displaying various kinds of information and entering various instructions.

The printing unit 36 prints images based on image data received from the printer controller 2 on recording media such as paper using a known image forming process such as an electronic photography type process.

The controller interface 37 is an interface for communicating with the locally connected printer controller 2.

Figure 7:
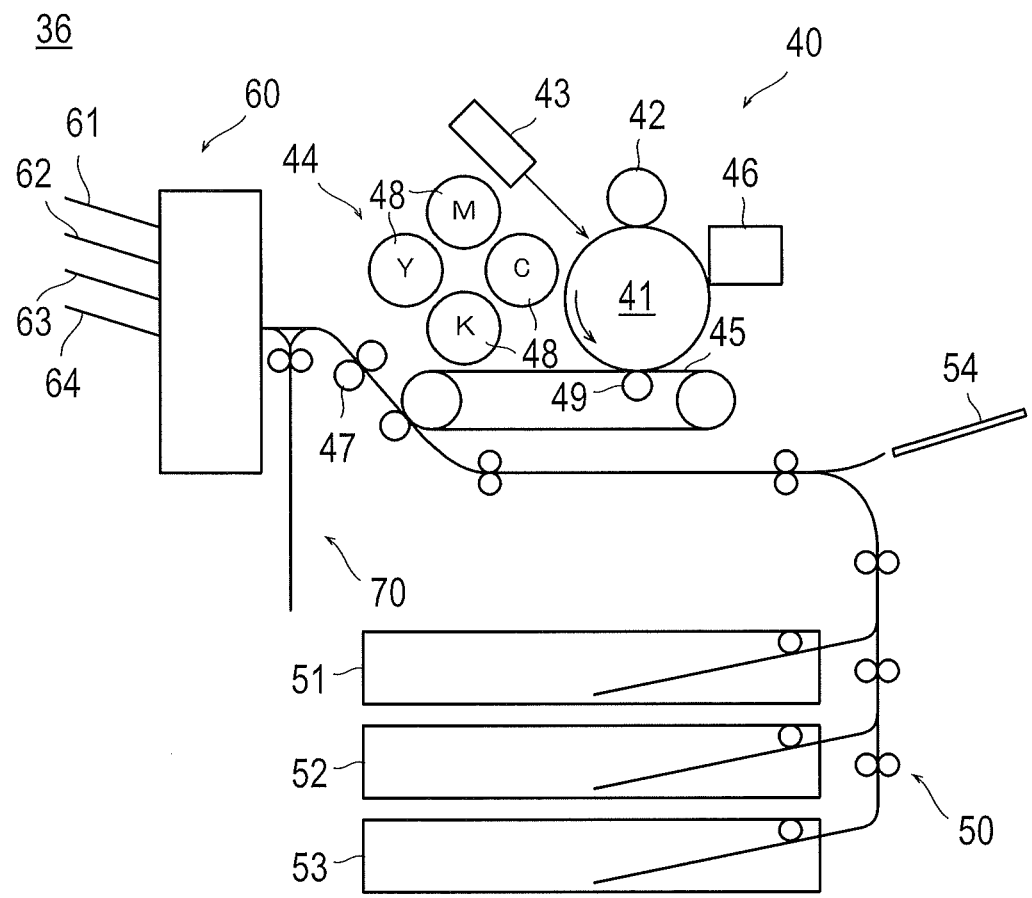
FIG. 7 is a diagram schematically showing the constitution of the printing unit of the printer shown in FIG. 6.

FIG. 7 is a diagram schematically showing the constitution of the printing unit of the printer shown in FIG. 6.

The printing unit 36 has a paper supply unit 50 for supplying recording media such as paper, an image forming unit 40 for forming images on the recording media, and a paper discharge unit 60 for discharging paper. The printing unit 36 also has a reversing mechanism unit 70 for reversing the front and back sides of paper.

The image forming unit 40 of the printing unit 36 has a photoconductor drum 41 that rotates in the arrow direction, a charging device 42, an exposing device 43, a developing device 44, an intermediate transfer belt 45, a cleaning device 46, and a fixing device 47. After the surface of the photoconductor drum 41 is evenly charged by means of the charging device 42, an electrostatic latent image is formed on the surface of the photoconductor drum 41 as it is irradiated with laser beams by the exposing device 43. The electrostatic latent image visualizes as the toner adheres to the electrostatic latent image on the photoconductor drum 41 in accordance with a turn of the photoconductor drum 41. The developing device 44 has developing rollers 48 for each of the colors, cyan (C), magenta (M), yellow (Y), and black (K), and visualized toner images of these colors are transported to the transfer unit 49, then onto the intermediate transfer belt 45, and overlaid on top of each other there, so that the overlaid color image can be transferred to the paper supplied from the paper supply unit 50. The toner images are then fixed on the paper by the fixing device 47 and transported to the paper discharge unit 60.

The paper supply unit 50 is equipped with first to third paper supply trays 51-53, and a manual paper supply tray 54. The paper discharge unit 60 is equipped with a plurality of paper discharge trays 61-64. The paper discharge unit 60 is equipped with a post-processing unit for applying finishing processes such as a stapling process for stapling a bundle of paper, a punching process for punching holes on the edge of paper for filing purposes, and a folding process for folding paper.

The PC 1, the printer controller 2, and the printer 3 can each contain constitutional elements other than those described above, or may lack a portion of the above-mentioned elements.

In a printing system constituted as described above, a document consisting of a plurality of pages is split in units of number of pages specified by the user, and the printer output process configured via the printing setting screen is applied to each of the split documents individually. The operation of the printing system of the present embodiment will be described below with reference to the FIG. 8 through FIG. 15.

Figure 8:
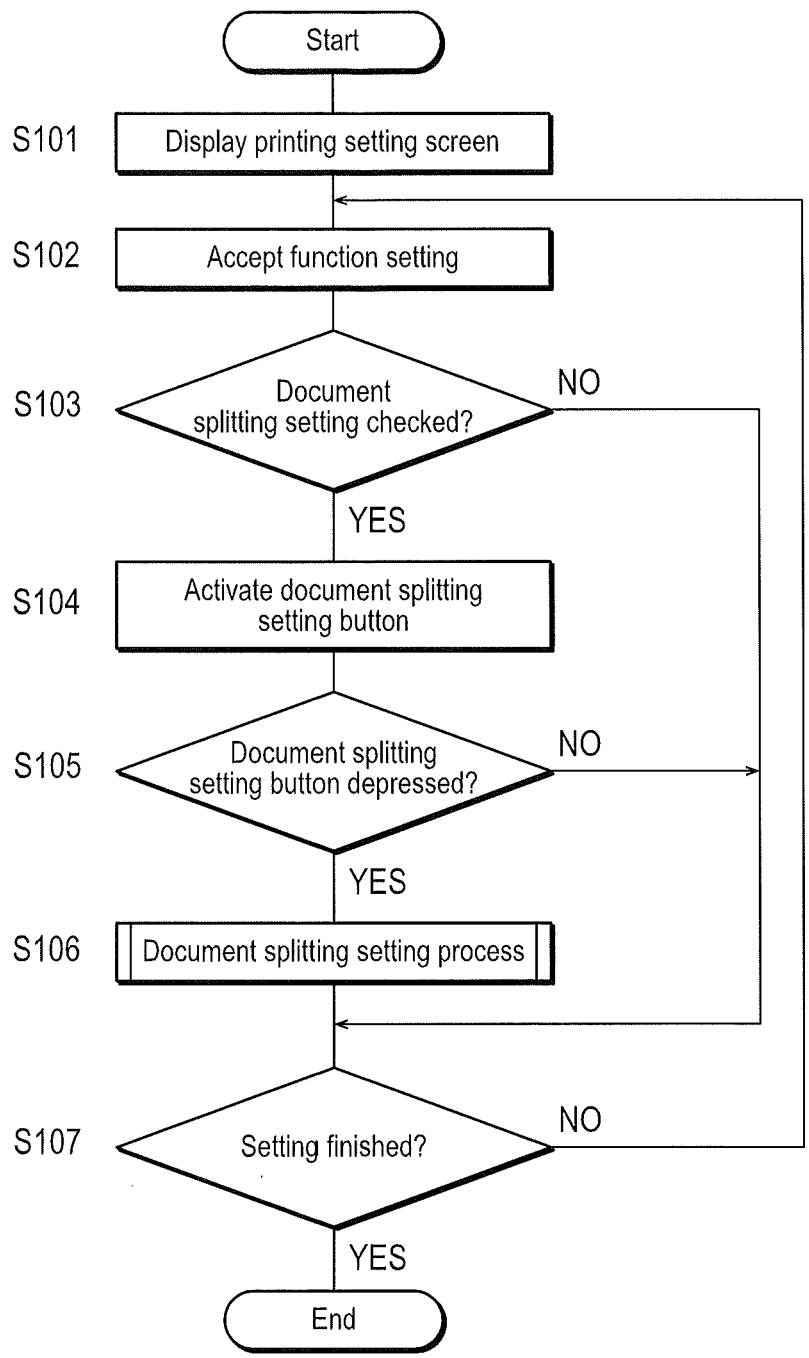
FIG. 8 is a flowchart showing the sequence of the printing setting process according to the first embodiment of the present invention.

FIG. 8 is a flowchart showing the sequence of the printing setting process on the PC. The algorithm shown in the flowchart of FIG. 8 is stored as a program in a memory unit such as a hard disk 14 of the PC 1 and executed by the CPU 11.

As shown in FIG. 8, the printing setting screen is displayed first (step S101). More specifically, the printing screen (not shown) is displayed on the display 15 of the PC 1 as the printer driver is activated, and the printing setting screen is displayed on the display 15 as the selection of the property/detail setting on the printing screen is made.

Figure 9:
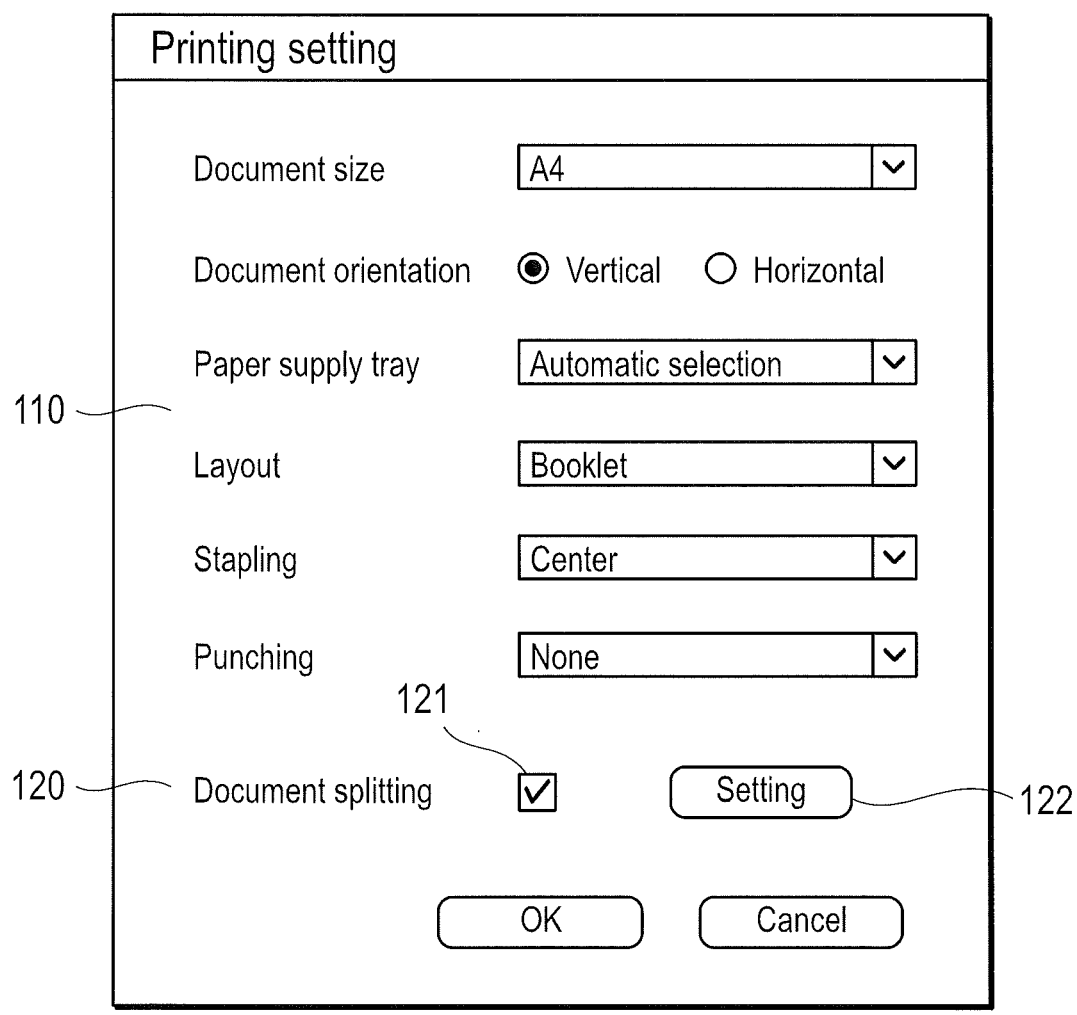
FIG. 9 is a diagram showing an example of the printing setting screen according to the first embodiment of the present invention.

FIG. 9 is a diagram showing an example of the printing setting screen according to the present embodiment. The printing setting screen 100 has a process content setting part 110 for accepting a setting of the printer output process, and a document splitting setting part 120 for setting up the document splitting process for splitting a document consisting of a plurality of pages in units of a specified number of pages. The process content setting part 110 accepts the user's setting concerning such processes as the layout process, the stapling process, and the punching process. The document splitting setting part 120 has a check box 121 for displaying the document splitting setting screen to be described later and a document splitting setting button 122 which is activated in coordination with the check box 121. The printing setting screen 100 also has an OK button and a cancel button.

Next, function settings are accepted via the printing setting screen 100 (step S102). More specifically, the printer output processes such as layout "booklet", staple "center", etc. are set up on the printing setting screen 100 by the user's mouse operation.

Next, a judgment is made as to whether or not the check box 121 of the document splitting setting part 120 is checked (step S103). More specifically, a judgment is made as to whether or not the check box 121 of the document splitting setting part 120 is set to "ON" by the user's mouse operation.

If it is judged that the check box 121 is not checked (step S103: No), the program advances to the process shown in step S107. On the other hand, if it is judged that the check box 121 is checked (step S103: Yes), the document splitting setting button 122 is activated (step S104). As the document splitting setting button 122 is activated, it becomes possible for the user to depress (click) the document splitting setting button 122 by the mouse operation.

Next, a judgment is made as to whether or not the document splitting setting button 122 is depressed (step S105). More specifically, a judgment is made as to whether or not the document splitting setting button 122 of the document splitting setting part 120 is depressed by the user's mouse operation.

If it is judged that the document splitting setting button 122 is not depressed (step S105: No), the program advances to the process shown in step S107. On the other hand, if it is judged that the document splitting setting button 122 is depressed (step S105: Yes), the document splitting setting process is executed (step S106). In the present embodiment, the document splitting setting process is executed for accepting the setting by the user concerning the number of pages to be used as a splitting unit for splitting a document consisting of a plurality of pages, etc. The detail of the document splitting setting process shown in step S106 will be described later.

Next, a judgment is made as to whether the setting should be finished or not (step S107). In the present embodiment, it is judged that the setting is finished when the OK button of the printing setting screen 100 is depressed by the user's mouse operation. If it is judged that the setting is not finished (step S107: No), the program returns to the process shown in step S102. On the other hand, if it is judged that the setting is finished (step S107: Yes), the process is terminated.

As can be seen from the above, according to the process of the flowchart shown in FIG. 8, the printing setting screen 100 is displayed during the printing setting for a document consisting of a plurality of pages and the printing setting is done by the user via the printing setting screen 100.

Figure 10:
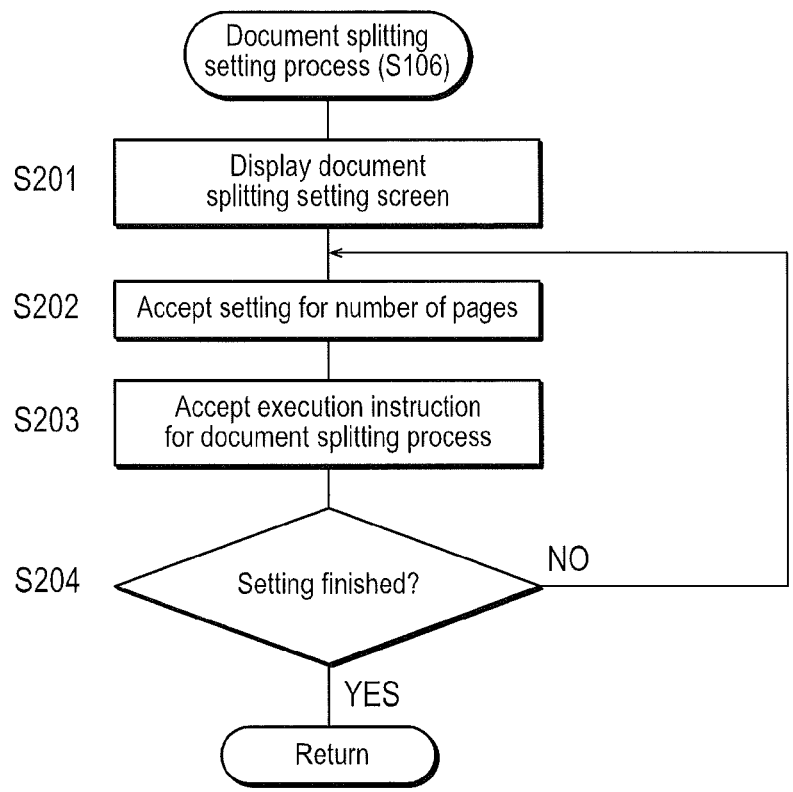
FIG. 10 is a flowchart showing the sequence of the document splitting setting process shown in step S106 of FIG. 8.

FIG. 10 is a flowchart showing the sequence of the document splitting setting process shown in step S106 of FIG. 8.

As shown in FIG. 10, the document splitting setting screen is displayed first (step S201). In the present embodiment, if it is judged that the document splitting setting button 122 of the printing setting screen 100 is depressed in the process shown in step S105 of FIG. 8, the document splitting setting screen is displayed on the display 15 of the PC 1.

Figure 11:
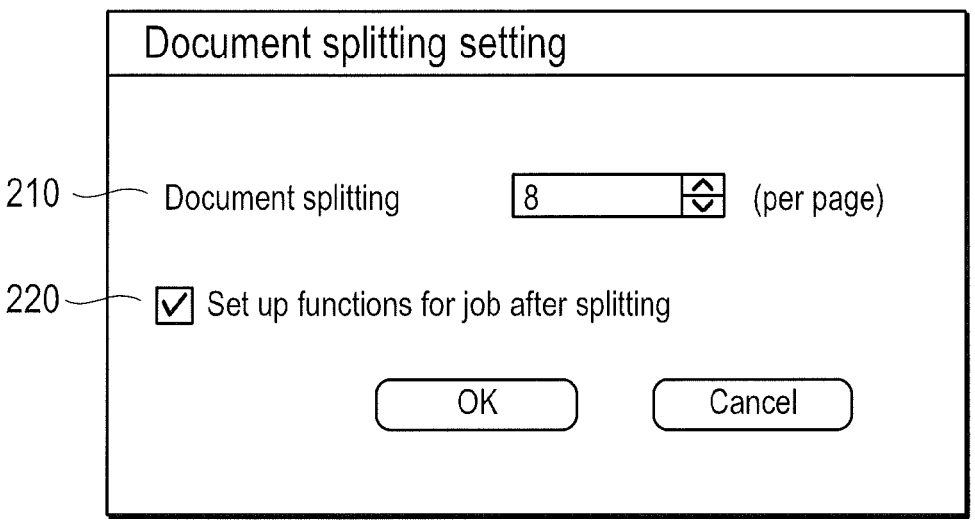
FIG. 11 is a diagram showing an example of the document splitting setting screen.

FIG. 11 is a diagram showing an example of the document splitting setting screen. The document splitting setting screen 200 has a number-of-pages setting accepting part 210 for accepting the setting for the number of pages to be used as a splitting unit for splitting a document, and a split instruction check box 220 for instructing the execution of document splitting process for splitting a document consisting of a plurality of pages in units of a specified number of pages. The document splitting setting screen 200 also has an OK button and a cancel button.

Next, the setting for number of pages is accepted (step S202). In the present embodiment, the number of pages to be used as a splitting unit for splitting a document consisting of a plurality of pages (hereinafter referred to as "splitting number of pages") is specified by the user's operation on the number-of-pages setting accepting part 210 of the document splitting setting screen 200. In FIG. 11, the splitting number of pages is specified as 8.

Next, the execution instruction for the document splitting process is accepted (step S203). More specifically, as the split instruction check box 220 of the document splitting setting screen 200 is set to "ON", the execution of the document splitting process is instructed for individually applying the printer output process configured on the printing setting screen 100 to the plurality of split documents obtained by splitting the document.

Next, a judgment is made as to whether the setting should be finished or not (step S204). In the present embodiment, it is judged that the setting is finished when the OK button of the document splitting setting screen 200 is depressed by the user's mouse operation. If it is judged that the setting is not finished (step S204: No), the program returns to the process shown in step S202. On the other hand, if it is judged that the setting is finished (step S204: Yes), the process is terminated.

As can be seen from the above, according to the process of the flowchart shown in FIG. 10, the number of pages to be used as a splitting unit for splitting a document is specified, and the printer output processes configured on the printing setting screen 100 are instructed to be applied individually to the plurality of split documents.

A print job containing the printing setting information which contains the information indicating the splitting number of pages specified in the process of the flowchart shown in FIG. 10 and the information indicating the printer output process configured on the printing setting screen 100, and the print data of a document consisting of a plurality of pages is transmitted from the PC 1 to the printer controller 2. Moreover, the print job can be set up with a authorization mode wherein the user is requested to enter a password in printing the document by the printer 3.

Figure 12:
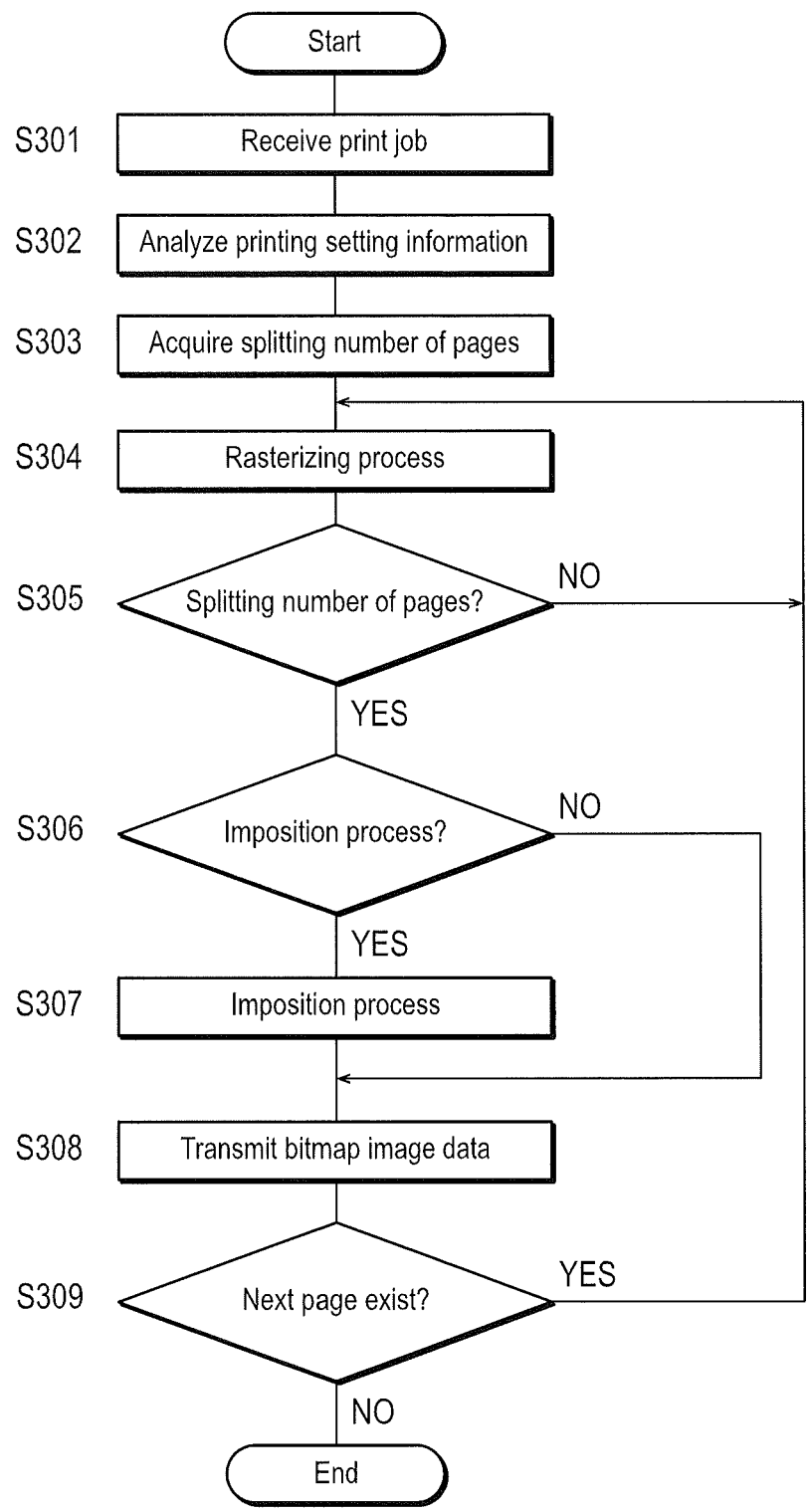
FIG. 12 is a flowchart showing the sequence of the printing control process on the printer controller.

FIG. 12 is a flowchart showing the sequence of the printing control process on the printer controller. The algorithm shown in the flowchart of FIG. 12 is stored as a program in a memory unit such as a hard disk 24 of the printer controller 2 and executed by the CPU 21.

As shown in FIG. 12, the print job is received first (step S301). In the present embodiment, a print job containing the printing setting information which contains the information indicating the splitting number of pages which is a splitting unit for splitting a document and the information indicating the printer output process of the document, and the print data of the document is received. The received print job is temporarily stored in the hard disk 24.

Next, the printing setting information contained in the print job is analyzed (step S302). As the printing setting information is analyzed, the information such as the splitting number of pages and the printer output processes of the document is obtained.

FIG. 13 is a diagram showing an example of the printing setting information (command information) contained in the print job according to the present embodiment. In the printing setting information shown in FIG. 13, it is instructed to split a document consisting of a plurality of pages in units of 8 pages and apply the imposition process, the double side printing process, the folding process, and the stapling process individually to each of the split documents each consisting of 8 pages to produce booklets.

Next, the splitting number of pages is acquired (step S303). In the present embodiment, the splitting number of pages (e.g., 8 pages) which is the splitting unit for splitting a document is acquired by analyzing the printing setting information in the process shown in step S302.

Next, the rasterizing process is executed (step S304). In the present embodiment, the rasterizing process is applied to the print data of the document contained in the print job received in the process shown in step S301. As the rasterizing process is executed, the print data is developed and the image data of the bitmap format is generated sequentially starting with the first page.

Next, a judgment is made as to whether or not the image data is generated for as many as the splitting number of pages (step S305). In the present embodiment, a judgment is made as to whether or not the image data is generated for the splitting number of pages (e.g., for 8 pages) acquired in the process shown in step S303.

If it is judged that the image data is not generated for the splitting number of pages (step S305: No), the program returns to the process shown in step S304. On the other hand, if it is judged that the image data is generated for the splitting number of pages (step S305: Yes), a judgment is made as to whether the imposition process should be executed or not (S306). More specifically, a judgment is made as to whether or not the imposition process is specified by analyzing the printing setting information of the print job. If the layout "booklet" is specified in the printing setting information, it is judged that the imposition process is specified.

If it is judged that the imposition process is not executed (step S306: No), the program advances to the process shown in step S308. On the other hand, if it is judged that the imposition process is executed (step S306: Yes), the imposition process is executed (step S307). For example, if it is to print saddle stitched booklets, the image data for two pages are imposed. At this time, if the splitting number of pages is an odd number (e.g., 7 pages), the image data for one page generated in the process shown in step S304 is imposed with image data corresponding to a blank sheet.

Next, the image data is transmitted (step S308). In the present embodiment, the image data generated for splitting number of pages (e.g., for 8 pages) in the process shown in step S304 is transmitted to the printer 3. With the transmission of the image data, the printer output processes of the image data (e.g., the double side printing process, the folding process, and the stapling process) are instructed.

Next, a judgment is made as to whether there is a next page or not (step S309). If it is judged that there is a next page (step S309: Yes), the steps S304 and thereafter are repeated until it is judged that there is no next page. On the other hand, if it is judged that there is no next page (step S309: No), the process is terminated.

As can be seen from the above, according to the process of the flowchart shown in FIG. 12, the image data of the bitmap format is generated as the print data of a document consisting of a plurality of pages is developed, and image data for the splitting number of pages is transmitted from the printer controller 2 to the printer 3 as soon as the image data for the splitting number of pages is generated. With the transmission of the image data, the printer output processes of the image data are instructed.

Figure 14:
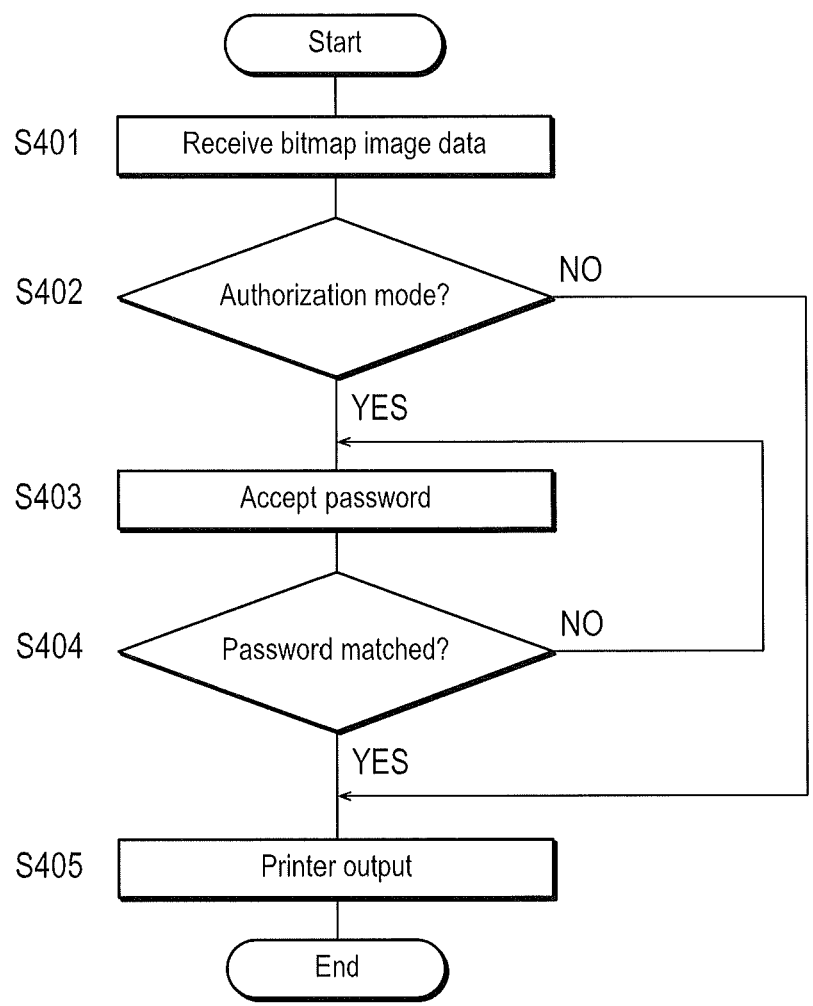
FIG. 14 is a flowchart showing the sequence of the printing process on the printer.

FIG. 14 is a flowchart showing the sequence of the printing process on the printer. The algorithm shown in the flowchart of FIG. 14 is stored as a program in a memory unit such as a hard disk 34 of the printer 3 and executed by the CPU 31.

As shown in FIG. 14, the image data is received first (step S401). In the present embodiment, the image data for the splitting number of pages, which is transmitted from the printer controller 2, is received. The received image data is temporarily stored in the hard disk 34.

Next, a judgment is made as to whether or not an authorization mode is set up in the print job (step S402). For example, it is judged that an authorization mode is set up in a print job, if the authorization mode is selected and an authorization password is set up by the user's operation via the printer driver in requesting a print job.

If it is judged that the authorization mode is not set up in the print job (step S402: No), the program advances to the process shown in step S405. On the other hand, if it is judged that the authorization mode is set up in the print job (step S402: Yes), the password is accepted (step S403). In the present embodiment, the input screen prompting the user to enter the password is displayed on the operating panel unit 35 of the printer 3, and the password entered by the user via the operating panel unit 35 is accepted.

Next, a judgment is made as to whether the password matches or not (step S404). In the present embodiment, a judgment is made as to whether or not the authorization password set up by the user via the printer driver at the time of requesting the print job matches the password entered by the user in the process shown in step S403.

If it is judged that the password does not match (step S404: No), the program returns to the process shown in step S403. On the other hand, if it is judged that the password matches (step S404: Yes), an image based on the image data is printed out (step S405), and the process is terminated. More specifically, images based on the image data which is generated by imposing image data for two pages are printed on both sides of a sheet of paper, and two sheets of paper are saddle stitched when they are output to produce a booklet consisting of 8 pages. The booklets will be produced as many as the number obtained by dividing the number of pages of the document prior to splitting by the splitting number of pages.

Figure 15:
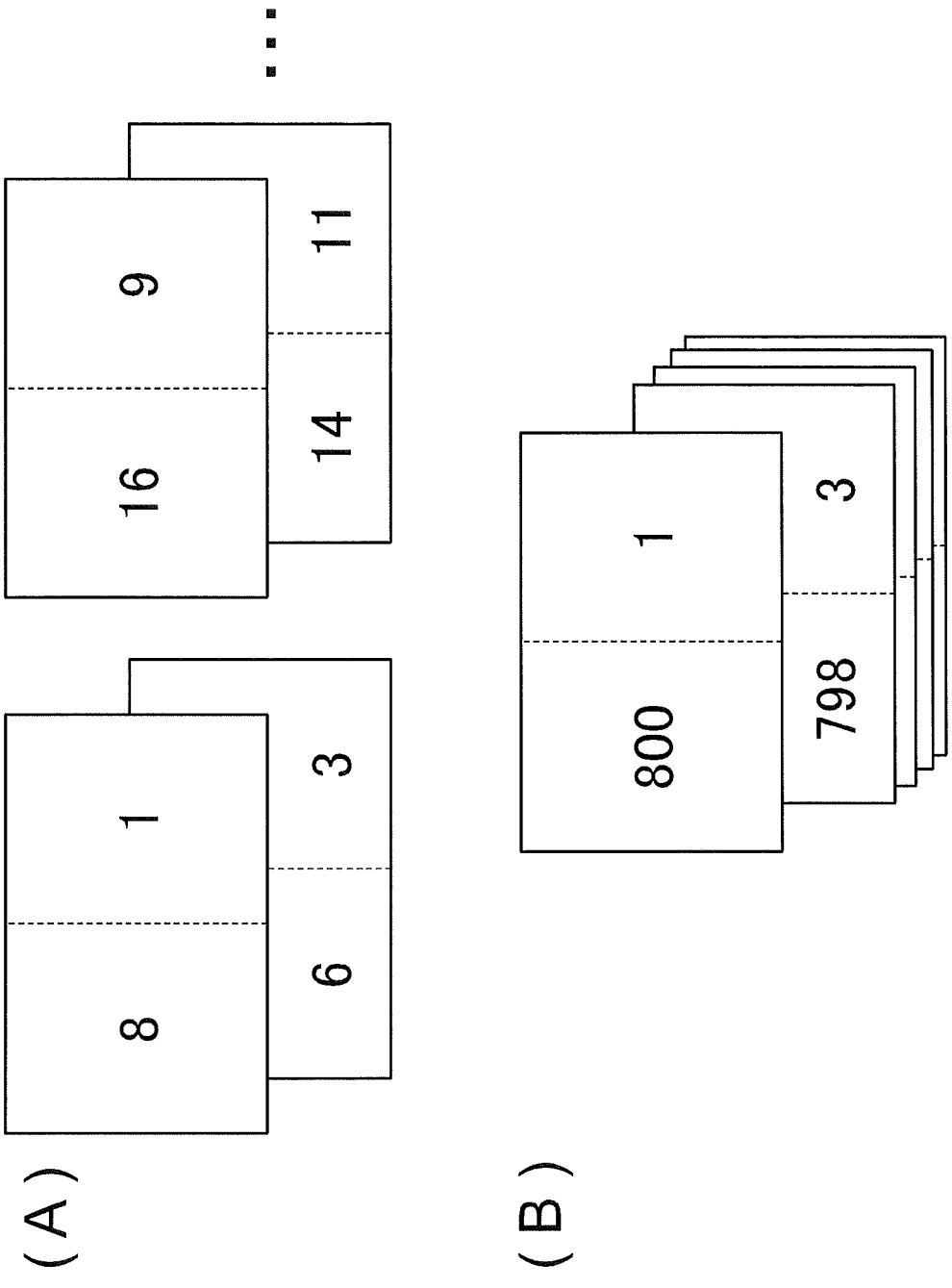
FIG. 15 is a diagram showing an example of the printer output of a document consisting of 800 pages.

FIG. 15 is a diagram showing an example of the printer output of a document consisting of 800 pages. FIG. 15 (A) is a diagram showing an example of a printed matter printed out when the execution of the document splitting setting process is instructed, and FIG. 15 (B) is a diagram showing an example of a printed matter printed out when the execution of the document splitting setting process is not instructed.

As shown in FIG. 15 (B), a single booklet of 800 pages is produced based on the print data when the execution of the document splitting setting process is not instructed. On the other hand, as shown in FIG. 15 (A), 100 booklets of 8 pages are produced when the execution of the document splitting setting process is instructed.

As can be seen from the above, according to the present embodiment, when the user sets up desired printer output process via the printing setting screen 100 and specifies the number of pages which is a splitting unit for splitting a document consisting of a plurality of pages, the document consisting of the plurality of pages is split to produce a plurality of split documents to which the desired printer output process is individually applied. In other words, it becomes possible to split a document consisting of a plurality of pages in units of the desired number of pages and to apply desired printer output process individually to each of the split documents with one time printing setting operation by the user, thus reducing the user's burden in the printing setting operation.

Also, according to the present embodiment, since it becomes possible to split a document consisting of a plurality of pages in units of the desired number of pages and to apply desired printer output process individually to each of the split documents with one time printing setting operation by the user, it can prevent errors by the user in settings which can occur in executing printing settings repeatedly while specifying the range of pages each time.

Also, according to the present embodiment, there is no need for entering the password repeatedly via the operating panel unit 35 of the printer 3 for allowing a plurality of split documents to be printed out, thus it becomes possible, for example, to allow a plurality of booklets to be printed out by entering the password only once. Furthermore, for example, in interrupting the printer output of a plurality of split documents, it is possible to interrupt the printing of a plurality of split documents without specifying the interruption repeatedly but by specifying the interruption only once. In other words, it can reduce the user's burden in the authorization operation and the interruption setting operation for print job.

Second Embodiment

Next, the second embodiment of the present invention will be described below with reference to FIG. 16. The present embodiment is an embodiment for applying desired printer output process to specific page of each of the split documents obtained by splitting a document consisting of a plurality of pages in units of splitting number of pages.

Figure 16:
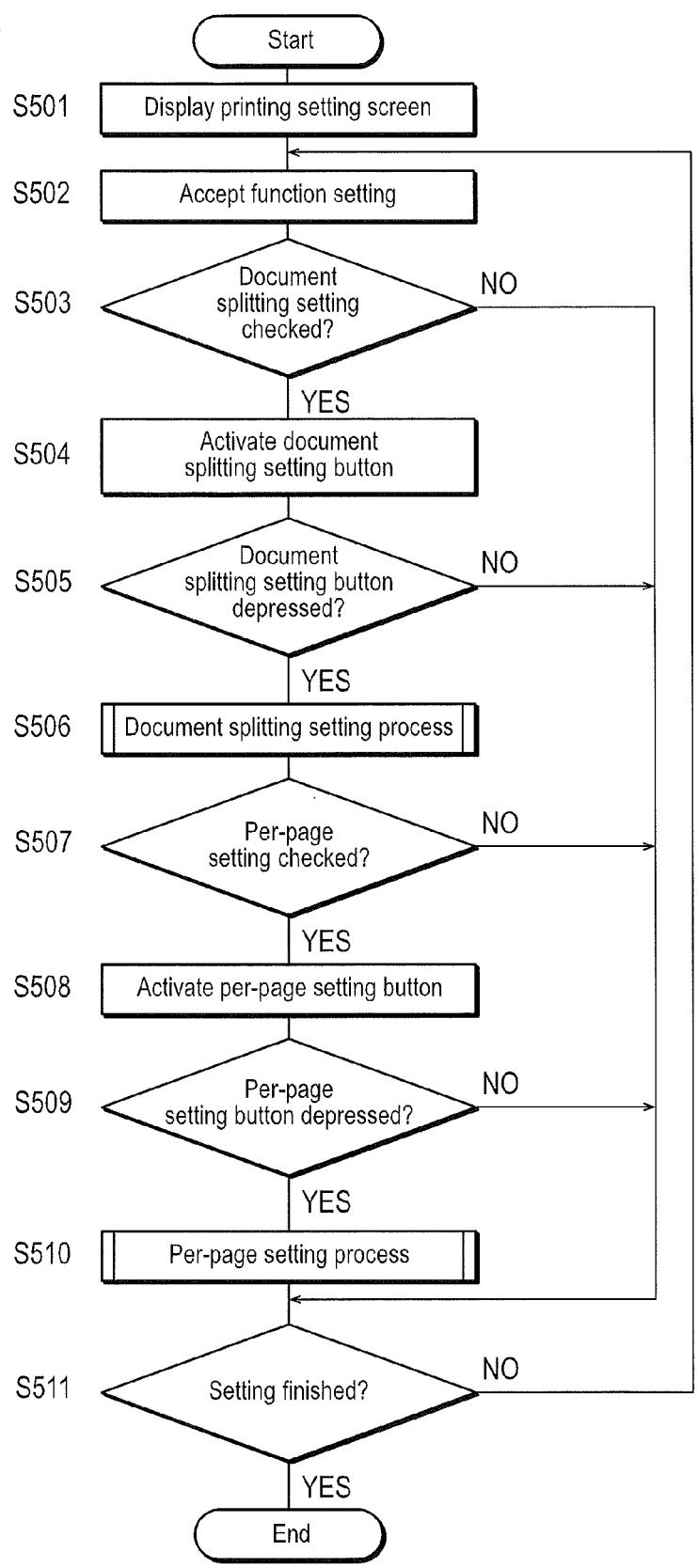
FIG. 16 is a flowchart showing the sequence of the printing setting process according to the second embodiment of the present invention.

FIG. 16 is a flowchart showing the sequence of the printing setting process according to the present embodiment. The algorithm shown in the flowchart of FIG. 16 is stored as a program in a memory unit such as a hard disk 14 of the PC 1 and executed by the CPU 11.

As shown in FIG. 16, the printing setting screen is displayed first (step S501). More specifically, as the printer driver is activated and the selection of the property/detail setting on the printing screen (not shown) is made, the printing setting screen is displayed on the display 15 of the PC 1.

Figure 17:
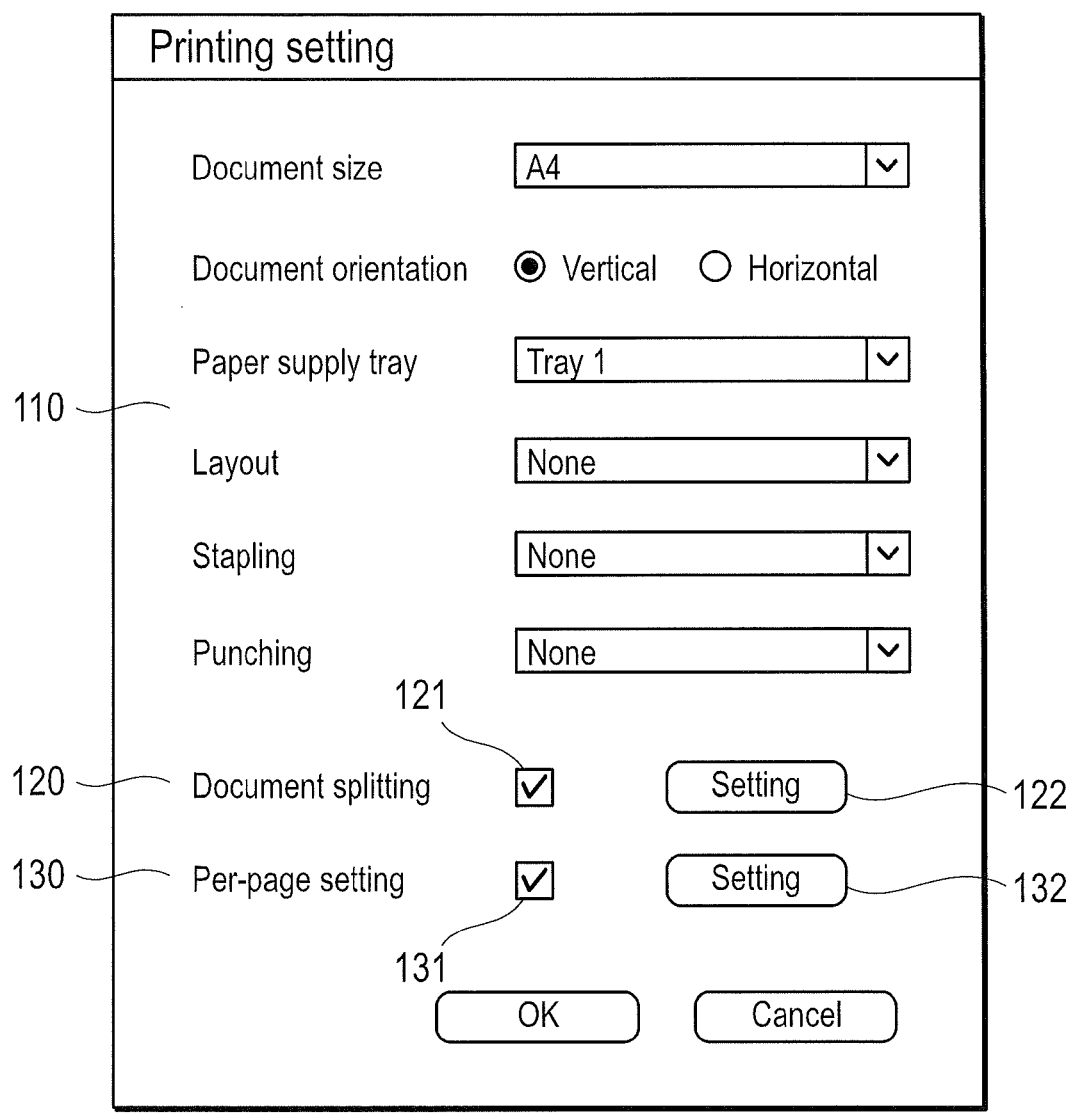
FIG. 17 is a diagram showing an example of the printing setting screen according to the second embodiment of the present invention.

FIG. 17 is a diagram showing an example of the printing setting screen according to the present embodiment. The printing setting screen 100' has a process content setting part 110 for accepting a setting of the printer output process, a document splitting setting part 120 for setting up the document splitting process for splitting a document consisting of a plurality of pages in units of a specified number of pages, and a per-page setting part 130 for setting up a per-page process for applying specific process on certain page of the split document. As the constitution of the printing setting screen 100' of the present embodiment is identical to the constitution of the first embodiment except the addition of the per-page setting part 130, the detailed description is omitted here.

The per-page setting part 130 has a check box 131 for displaying the per-page function setting screen to be described later and a per-page setting button 132 which is activated in coordination with the check box 131.

Next, function settings are accepted via the printing setting screen 100' (step S502). More specifically, the printer output processes such as paper supply tray "tray 1", layout "None", etc. are set up on the printing setting screen 100' by the user's mouse operation.

Next, a judgment is made as to whether or not the check box 121 of the document splitting setting part 120 is checked (step S503). More specifically, a judgment is made as to whether or not the check box 121 of the document splitting setting part 120 is set to "ON" by the user's mouse operation.

If it is judged that the check box 121 is not checked (step S503: No), the program advances to the process shown in step S511. On the other hand, if it is judged that the check box 121 is checked (step S503: Yes), the document splitting setting button 122 is activated (step S504).

Next, a judgment is made as to whether or not the document splitting setting button 122 is depressed (step S505). If it is judged that the document splitting setting button 122 is not depressed (step S505: No), the program advances to the process shown in step S511.

On the other hand, if it is judged that the document splitting setting button 122 is depressed (step S505: Yes), the document splitting setting process is executed (step S506). In the present embodiment, the document splitting setting process is executed for accepting the setting for the document splitting process via the document splitting setting screen 200 shown in FIG. 18. Since the document splitting setting process shown in step S506 is identical to the process of the flowchart shown in FIG. 10, the detailed description is omitted here.

Next, a judgment is made as to whether or not the check box 131 of the per-page setting part 130 is checked (step S507). More specifically, a judgment is made as to whether or not the check box 131 of the per-page setting part 130 is set to "ON" by the user's mouse operation.

If it is judged that the check box 131 is not checked (step S507: No), the program advances to the process shown in step S511. On the other hand, if it is judged that the check box 131 is checked (step S507: Yes), the per-page setting button 132 is activated (step S508). As the per-page setting button 132 is activated, it becomes possible for the user to depress the per-page setting button 132 by the mouse operation.

Next, a judgment is made as to whether or not the per-page setting button 132 is depressed (step S509). More specifically, a judgment is made as to whether or not the per-page setting button 132 of the per-page setting part 130 is depressed by the user's mouse operation.

If it is judged that the per-page setting button 132 is not depressed (step S509: No), the program advances to the process shown in step S511. On the other hand, if it is judged that the per-page setting button 132 is depressed (step S509: Yes), the per-page setting process is executed (step S510). In the present embodiment, the per-page setting process is executed for accepting the page number for the split document obtained by splitting a document consisting of a plurality of pages, among the page numbers starting with page 1 corresponding to the first page of each split document, and the content of the process applied to the page corresponding to the particular page number. The detail of the per-page setting process shown in step S510 will be described later.

Next, a judgment is made as to whether the setting should be finished or not (step S511). If it is judged that the setting is not finished (step S511: No), the program returns to the process shown in step S502. On the other hand, if it is judged that the setting is finished (step S511: Yes), the process is terminated.

As can be seen from the above, according to the process of the flowchart shown in FIG. 16, the printing setting screen 100' is displayed during the printing setting for a document consisting of a plurality of pages and the printing setting is done by the user via the printing setting screen 100'.

Figure 19:
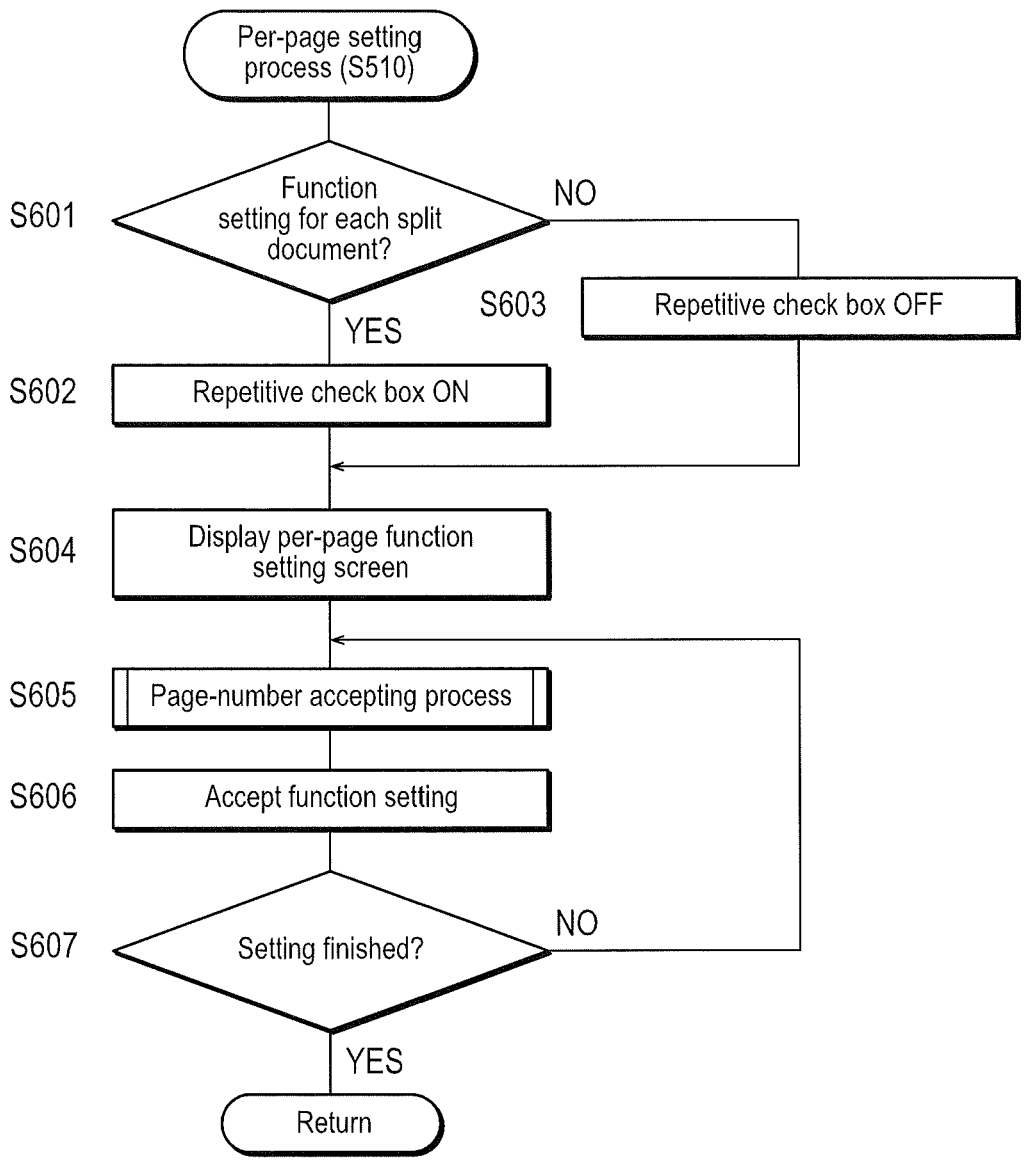
FIG. 19 is a flowchart showing the sequence of the per-page setting process shown in step S510 of FIG. 16.

FIG. 19 is a flowchart showing the sequence of the per-page setting process shown in step S510 of FIG. 16.

Figure 18:
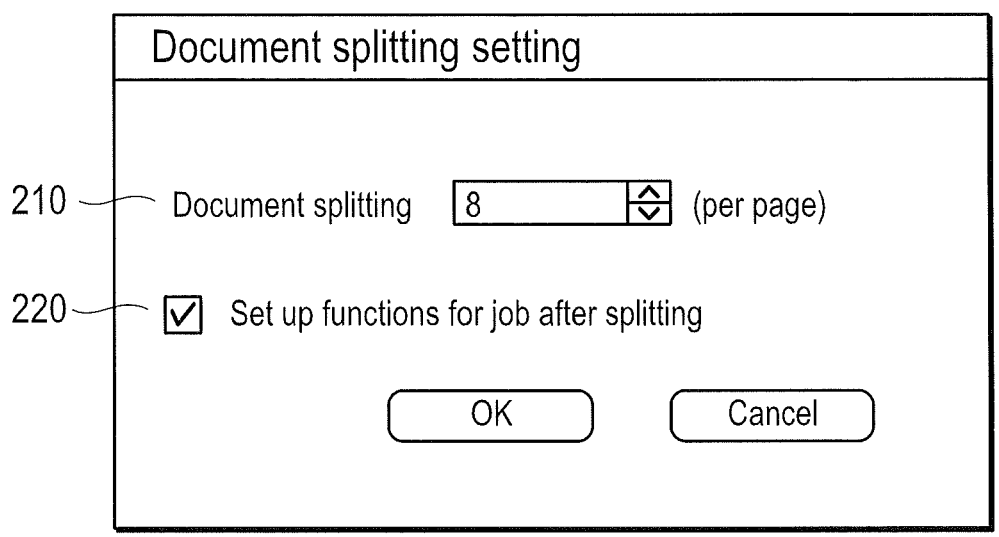
FIG. 18 is a diagram showing an example of the document splitting setting screen.

As shown in FIG. 19, a judgment is made as to whether or not function setting should be executed for each split document first (step S601). In the present embodiment, a judgment is made, ahead of the display of the per-page function setting screen to be described later, as to whether or not to execute the function setting for each split document (split job) based on a judgment of whether or not the check box 220 of the document splitting setting screen 200 shown in FIG. 18 is checked. If it is judged that the check box 220 of the document splitting setting screen 200 is checked, it is judged that the function setting should be executed for each split document.

If it is judged in the process shown in step S601 that the function setting is executed for each split document (step S601: Yes), the repetitive check box of the per-page function setting screen is set to "ON" (step S602). On the other hand, if it is judged that the function setting is not executed for each split document (step S601: No), the repetitive check box of the per-page function setting screen is set to "OFF" (step S603).

The per-page function setting screen is then displayed (step S604). In the present embodiment, the per-page function setting screen, of which the repetitive check box is set to "ON" or "OFF" by the process of step S602 or S603, is displayed on the display 15 of the PC 1.

FIG. 20 is a diagram showing an example of the per-page function setting screen. The per-page function setting screen 300 has a page-number setting accepting part 310 for accepting the setting of the page number among the page numbers starting with page 1 corresponding to the first page of each split document, and a process content setting part 320 for accepting the setting of process to be applied to the page of each split document corresponding to the page number accepted by the page-number setting accepting part 310. The page-number setting accepting part 310 has a plurality of input text boxes. The process content setting part 320 accepts the user's setting concerning such processes as the paper supply process, the stapling process, and the punching process. The per-page function setting screen 300 is provided with repetitive check boxes 330 which are set to "ON" or "OFF" by the process of step S602 or S603.

Next, the page-number accepting process is executed (step S605). In the present embodiment, the page-number accepting process is executed for accepting the user's setting concerning the page number among the page numbers starting with page 1 corresponding to the first page of each split document via the page-number setting accepting part 310 of the per-page function setting screen 300.

Figure 21:
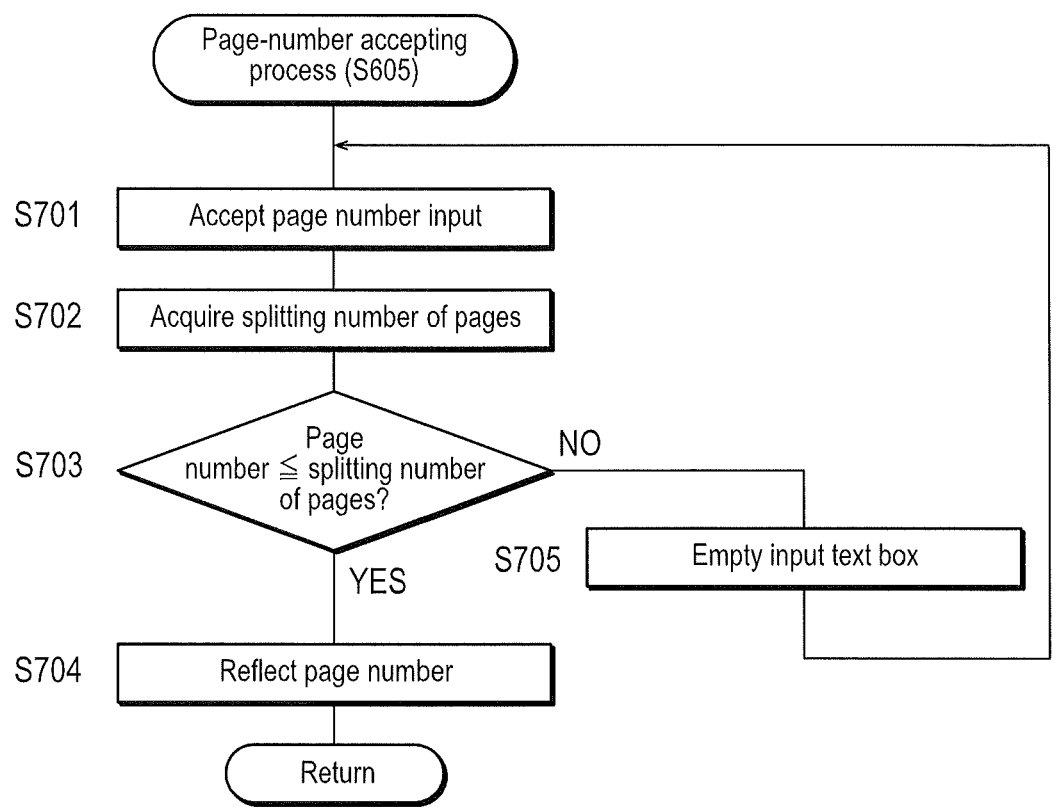
FIG. 21 is a flowchart showing the sequence of the page-number accepting process shown in step S605 of FIG. 19.

As shown in FIG. 21, the input of the page number is accepted first in the page-number accepting process (step S701). More specifically, a desired page number (e.g., 2) is entered in the input text box of the page-number setting accepting part 310 of the per-page function setting screen 300 by the user's operation.

Next, the splitting number of pages is acquired (step S702). In the present embodiment, the splitting number of pages (e.g., 8 pages) specified by the user in the document splitting setting process shown in step S506 of FIG. 16 is acquired.

Next, a judgment is made as to whether or not the entered page number is less than the splitting number of pages (step S703). More specifically, a judgment is made as to whether or not the page number accepted in the process shown in step S701 is less than the splitting number of pages acquired in the process shown in step S702.

If it is judged that the page number is less than the splitting number of pages (step S703: Yes), the page number is reflected upon the per-page function setting screen 300 (step S704), and the process is terminated. On the other hand, if it is judged that the page number is not less than the splitting number of pages (step S703: No), the input text box of the page-number setting accepting part 310 is emptied (step S705), and the program returns to the process shown in step S701. With such a constitution, it is possible to prevent a page number larger than the splitting number of pages from being entered by the user by mistake, thus preventing a printing error due to an erroneous input of the page number.

Next, function setting is accepted via the per-page function setting screen 300 (step S606). In the present embodiment, the setting of process applied to a certain page of each split document is accepted via the process content setting part 320 of the per-page function setting screen 300. For example, the paper supply process for supplying a sheet of paper for the page 2 of each split document from the second paper supply tray 52 is specified on the per-page function setting screen 300 shown in FIG. 20.

Next, a judgment is made as to whether the setting should be finished or not (step S607). In the present embodiment, it is judged that the setting is finished when the OK button of the per-page function setting screen 300 is depressed by the user's mouse operation. If it is judged that the setting is not finished (step S607: No), the program returns to the process shown in step S605. On the other hand, if it is judged that the setting is finished (step S607: Yes), the process is terminated.

As can be seen from the above, according to the process of the flowchart shown in FIG. 19, the page number among the page numbers starting with page 1 corresponding to the first page of each split document and the process which will be applied to the page corresponding to the particular page number are specified by the user. For example, in FIG. 20, the sheet of paper which corresponds to page 2 assigned by assigning the first page of each split document as page 1 is specified to be supplied from the second paper supply tray 52 for each one of a plurality of split documents obtained by splitting a document consisting of a plurality of pages in units of 8 pages. The sheets of paper which correspond to page 1 and pages 3-8 of each split document, are specified to be supplied from the first paper supply tray 51 via the printing setting screen 100'.

The process shown in step S606 in the flowchart shown in FIG. 19 can be executed prior to the process shown in step S605. Also, the page number received in the process shown in step S605 can be a plurality of page numbers (e.g., 2 through 7 pages). For example, a plurality of page numbers can be specified for each of the split documents consisting of 8 pages obtained by splitting a document so that the sheets of paper for 2 through 7 pages will undergo the stapling process.

FIG. 22 is a diagram showing an example of the printing setting information contained in the print job transmitted from the PC to the printer controller. As described in the above, in the printing setting information of FIG. 22, it is instructed that the document consisting of a plurality of pages is split in units of 8 pages, and the sheet of paper for the page 2 is supplied from the second paper supply tray 52 and the sheets of paper for the rest of the pages are supplied from the first paper supply tray 51 for each of the split documents consisting of 8 pages.

FIG. 23 is a diagram for describing the function effect of the printing control process of the present embodiment.

FIG. 23 is a diagram showing, as a comparative example, the per-page function setting screen for specifying the process to be applied to the page corresponding to the second page of each split document individually in splitting a document consisting of a plurality of pages in units of 8 pages. In the per-page function setting screen 300' shown in FIG. 23, the user needs to specify page 2, page 10, . . . page 794, i.e., all the pages that correspond to the second page of each split document, so that the user needs to bear a heavy burden in the printing setting operation. On the other hand, specifying the second page of each split document using the split document as the base on the per-page function setting screen 300 shown in FIG. 20 makes it possible to realize the identical process as in the setting done on the per-page function setting screen 300' shown in FIG. 23.

Figure 24:
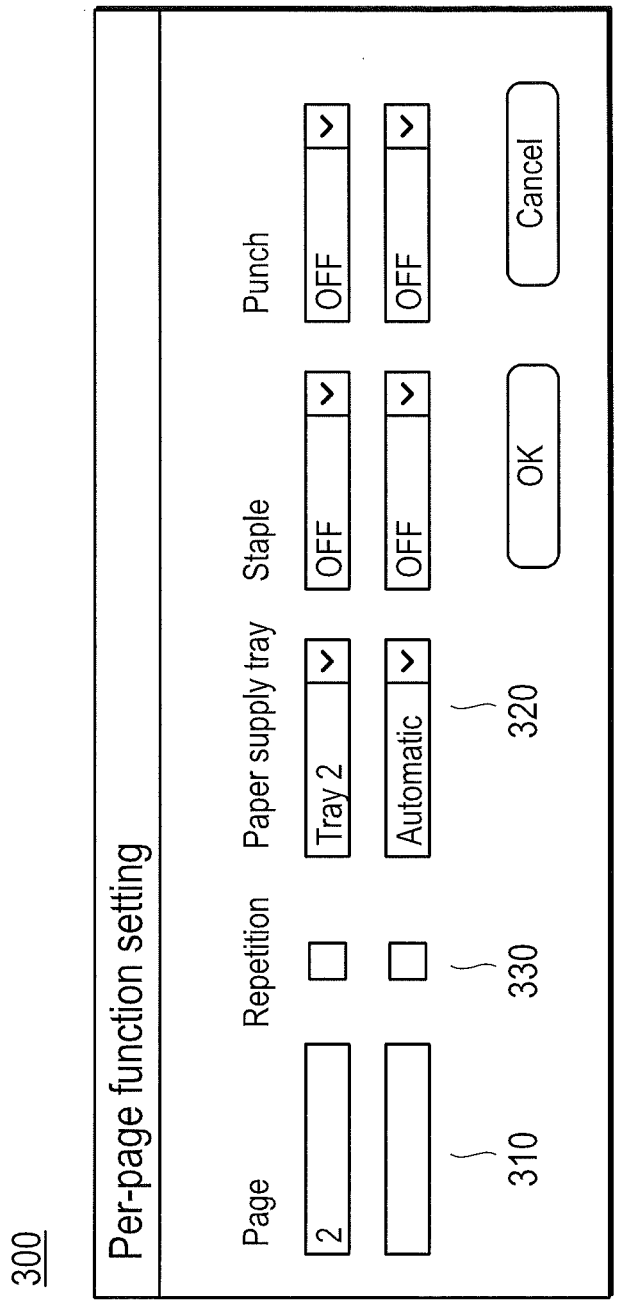
FIG. 24 is a diagram showing the per-page function setting screen where the repetitive check box is set to "OFF".

FIG. 24 is a diagram showing the per-page function setting screen where the repetitive check box is set to "OFF" and FIG. 25 is a diagram showing an example of the printing setting information generated based on the per-page function setting screen where the repetitive check box is set to "OFF". As shown in FIG. 24 and FIG. 25, the second paper supply tray 52 supplies a sheet of paper to only the second page of the document consisting of 800 pages, while the first paper supply tray 51 supplies sheets of paper to all the remaining 799 pages when the repetitive check box is set to "OFF".

The invention is not limited to the embodiment described above, but also can be changed in various ways within the scope of the claims.

For example, in the embodiment described above, the printer output processes were described using the cases of applying imposition process, stapling process, punching process, double side printing process, etc., as well as the paper supply process for supplying sheets of paper from different paper supply trays to specified pages. However, the printer output processes are not limited to them, but rather may include the numbering process for printing a page number on a sheet of paper, the tab sheet insertion process for inserting a tab sheet for a specified page, the sheet specifying process for specifying a sheet of paper to be used for printing of a specific page, the overlay process for overlaying a plurality of images, the watermark printing process for printing watermark on a sheet of paper, etc.

More specifically, when it is specified to split a document in units of 7 pages and to apply the double side printing process to each of the split documents, the system prints out a plurality of bundles of 4 sheets of paper each printed with images for 7 pages, while the back side of the fourth sheet of each bundle is blank. If, in another case, it is specified to split a document in units of 8 pages and to apply the numbering process to each of the split documents, page numbers "1" through "8" will be printed on each of the split documents consisting of 8 pages. If, in another case, it is specified to split a document in units of 8 pages and to apply the tab sheet insertion process on the fourth page of each of the split documents, a tab sheet is inserted behind the fourth page (or in front of the fourth page) for each of the split documents consisting of 8 pages.

Furthermore, in the embodiment described above, although a case of generating the print data by the printer driver was described, the present invention is applicable to PDF (Portable Document Format) direct printing and printing configuration using job ticket as well.

Furthermore, in the embodiment described above, although a printer controller is shown as the printing control apparatus, the invention is not limited to it, but rather it can be applied to MFT (Multi-Function Peripheral) as well.

The means and method of conducting various processes in the printing system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is ordinarily transferred to and stored in a memory unit such as a hard disk. Said program can also be provided as independent application software or can be built into the software of a printing system as a part of its function.

What is claimed is:

1. A printing system, comprising:
   a number-of-pages accepting part for accepting user-specified number of pages, which is referred to as splitting unit for splitting a document consisting of a plurality of pages;
   a control part for controlling a printer output operation of said document in such a way that each of split documents obtained by splitting said document from the first page sequentially in said splitting unit will undergo a printer output process configured via a printing setting screen;
   a page-number accepting part for accepting user-specified page number for said split documents among the page numbers starting with page 1 corresponding to the first page of each split document; and
   a process content accepting part for accepting user-specified content of per-page printer output process for the page corresponding to said page number, wherein
   said control part further controls said printer output operation in such a way that each of said split documents will undergo said per-page printer output process accepted by said process content accepting part, with respect to the page corresponding to said page number, and
   said page-number accepting part comprises:
      an input accepting part for accepting user input of a page number;
      a comparing part for comparing said page number accepted by said input accepting part with said splitting unit; and
      a nullifying part for nullifying said page number accepted by said input accepting part if said page number is greater than said splitting unit.

2. The printing system as claimed in claim 1, further comprising:
   a selection accepting part for accepting the user's selection concerning whether or not the system should control said printer output operation in such a way that each of said split documents will undergo said printer output process, wherein
   said control part controls said printer output operation when said selection accepting part accepts a selection of controlling said printer output operation in such a way that each of said split documents will undergo said printer output process.

3. The printing system as claimed in claim 1, further comprising:
   a cease-instruction accepting part for accepting an instruction to cease the printer output of said split documents, wherein
   said control part ceases said printer output operation when said cease-instruction accepting part accepts said instruction to cease the printer output.

4. The printing system as claimed in claim 1, further comprising:
   an authorization part for displaying an input screen for prompting the user to enter a password for allowing said split document to be printed out, when such a password is set up in a print job containing said document, wherein
   said split documents are printed out sequentially when said password entered by the user matches the password set up in said print job.

5. A printing method, comprising:
   (a) accepting user-specified number of pages, which is referred to as splitting unit for splitting a document consisting of a plurality of pages;
   (b) controlling a printer output operation of said document in such a way that each of split documents obtained by splitting said document from the first page sequentially in said splitting unit will undergo a printer output process configured via a printing setting screen;
   (c) accepting user-specified page number for said split documents among the page numbers starting with page 1 corresponding to the first page of each split document; and
   (d) accepting user-specified content of per-page printer output process for the page corresponding to said page number, wherein
   in said step (b), said printer output operation is further controlled in such a way that each of said split documents will undergo said per-page printer output process accepted in said step (d), with respect to the page corresponding to said page number, and
   said step (c) comprises:
      (c1) accepting user input of a page number;
      (c2) comparing said page number accepted in said step (c1) with said splitting unit; and
      (c3) nullifying said page number accepted in said step (c1) if said page number is greater than said splitting unit.

6. The printing method as claimed in claim 5, further comprising:
   (e) accepting the user's selection concerning whether or not said printer output operation should be controlled in such a way that each of said split documents will undergo said printer output process, wherein in said step (b), said printer output operation is controlled when a selection of controlling said printer output operation in such a way that each of said split documents will undergo said printer output process is accepted in said step (e).

7. The printing method as claimed in claim 5, further comprising:
(f) accepting an instruction to cease the printer output of said split documents, wherein
in said step (b), said printer output operation is ceased when said instruction to cease the printer output is accepted in said step (f).

8. The printing method as claimed in claim 5, further comprising:
(g) displaying an input screen for prompting the user to enter a password for allowing said split document to be printed out, when such a password is set up in a print job containing said document, wherein
said split documents are printed out sequentially when said password entered by the user matches the password set up in said print job.

* * * * *